US012587575B2

(12) United States Patent
Mufti et al.

(10) Patent No.: US 12,587,575 B2
(45) Date of Patent: Mar. 24, 2026

(54) IMS RECOVERY

(71) Applicant: T-Mobile USA, Inc., Bellevue, WA (US)

(72) Inventors: Shujaur Mufti, Snoqualmie, WA (US); Saqib Badar, Bellevue, WA (US); Khurram Ahmad Mirza, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 150 days.

(21) Appl. No.: 18/482,361

(22) Filed: Oct. 6, 2023

(65) Prior Publication Data

US 2024/0064181 A1 Feb. 22, 2024

Related U.S. Application Data

(63) Continuation of application No. 17/551,100, filed on Dec. 14, 2021, now Pat. No. 11,818,179.

(51) Int. Cl.
| | |
|---|---|
| *H04L 65/1069* | (2022.01) |
| *H04L 65/1016* | (2022.01) |
| *H04L 65/1045* | (2022.01) |
| *H04L 65/1063* | (2022.01) |
| *H04L 65/1073* | (2022.01) |

(52) U.S. Cl.
CPC ...... *H04L 65/1069* (2013.01); *H04L 65/1016* (2013.01); *H04L 65/1045* (2022.05); *H04L 65/1063* (2013.01); *H04L 65/1073* (2013.01)

(58) Field of Classification Search
None
See application file for complete search history.

(56) References Cited

U.S. PATENT DOCUMENTS

| | | | |
|---|---|---|---|
| 2018/0109564 A1 | 4/2018 | Rahman | |
| 2019/0306202 A1* | 10/2019 | Sinha | H04L 65/1104 |
| 2020/0153874 A1* | 5/2020 | Christopher | H04L 65/1069 |
| 2022/0006845 A1 | 1/2022 | Zaifuddin et al. | |
| 2022/0191255 A1 | 6/2022 | Mufti et al. | |

* cited by examiner

*Primary Examiner* — Bryan Y Lee
(74) *Attorney, Agent, or Firm* — Lee & Hayes, P.C.

(57) ABSTRACT

Improved systems and method are described for addressing issues when an S-CSCF goes appears non-responsive or an application server appears non responsive. Profile recovery is executed through application servers which may allow additional options in efficiencies in maintain applications while recovering from the non-responsive devices.

16 Claims, 6 Drawing Sheets

IMS RECOVERY

CROSS-REFERENCE TO RELATED APPLICATION

This application is a continuation of and claims priority to commonly assigned, co-pending U.S. application Ser. No. 17/551,100, filed Dec. 14, 2021, which claims priority to U.S. provisional application No. 63/125,129, filed on Dec. 14, 2020, entitled "IMS RECOVERY". Application Ser. No. 17/551,100 and 63/125,129 are fully incorporated herein by reference.

BACKGROUND

Internet Protocol Multimedia Subsystem (IMS) is an architectural framework defined by the $3^{rd}$ Generation Partnership Project (3GPP) for delivering Internet Protocol (IP) multimedia to user equipment (UE) of the IMS network. An IMS core network (sometimes referred to as the "IMS core", the "Core Network (CN)," or the "IM CN Subsystem") permits wireless and wireline devices to access IP multimedia, messaging, and voice applications and services. IMS allows for peer-to-peer communications, as well as client-to-server communications over an IP-based network.

During a registration procedure with the IMS core network, the UE is assigned a serving call session control function (S-CSCF) node and an application server (AS). These assigned nodes are tasked with serving the UE during a subsequent communication session, and all signaling originating from, and terminating at, the UE during the communication session is to be routed through the assigned nodes of the IMS core. However, it is possible for one or more of the assigned IMS nodes to become unavailable such that a communication session cannot be conducted using the now-unavailable node(s). For example, hardware and/or software of the assigned S-CSCF node and/or the assigned AS may malfunction or crash, rendering the IMS node inoperable.

When an assigned IMS node becomes unavailable during a communication session, after a brief retry period, an IMS restoration procedure is carried out to restore the communication session for the UE (as well as for other UEs assigned to the failed node) so that an available IMS node may continue to serve the UE. In at least some instances, existing IMS restoration procedures involve tearing down the existing communication session (e.g., sending an error response, such as a 504 error message, to the UE) in response to an IMS node becoming unavailable. This forces the UE to re-register with the IMS so that the UE may be re-assigned an available node (e.g., an available S-CSCF node). In this scenario, the service being provided to the UE is disrupted by the IMS restoration procedure. For example, a phone call may be dropped, and the user may be forced to re-dial the party with whom they were previously communicating.

Existing IMS restoration procedures may also involve unneeded communications between IMS nodes, which unnecessarily consumes network bandwidth during IMS restoration, and causes an undesirable delay that may be noticeable to the end user. For example, when a backup IMS node is called upon to provide service to a UE involved in a restoration procedure, the backup IMS node may transmit requests to other IMS nodes for additional information pertaining to the "unrecognized" UE (e.g., a profile recovery request), or to find a new IMS node to serve the UE, such as by issuing a third party register (TPR) message to discover a new, available AS to serve the UE, and so on. For a large number of UEs involved in a correspondingly large number of communication sessions that are affected by a failed IMS node(s), this added load on the network due to unneeded communication between IMS nodes may significantly impact network bandwidth.

Current IMS restoration procedures may also leave stale bindings between a UE involved in a restoration procedure and a previously-assigned IMS node. These stale bindings may remain in data repositories of the IMS core network, creating a data duplication problem where the repository data indicates that the UE is assigned to multiple IMS nodes of the same type. For example, a UE that has had a communication session restored might end up being assigned to multiple, different AS's. Accordingly, when a query is issued to discover information pertaining to the UE, and stale bindings exist in repository data for that UE, incorrect data may be returned for such a query.

SUMMARY

Improved systems and method are described for addressing issues when an S-CSCF goes appears non-responsive or an application server appears non-responsive. Profile recovery is executed through application servers which may allow additional options in efficiencies in maintain applications while recovering from the non-responsive devices.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

SPECIFICATION

In general, the techniques and systems described herein allow for faster restoration of a communication session, as well as a reduction in network bandwidth consumption, as compared to existing IMS restoration procedures that take longer and consume more network bandwidth. This is due, at least in part, to the elimination of unneeded communication between IMS nodes, as well as the avoidance of tearing down an existing communication session in order to restore it. This, in turn, may reduce processor load significantly when a large number of UEs are involved in a correspondingly large number of ongoing communication sessions impacted by an IMS node failure.

Also disclosed herein are systems comprising one or more processors and one or more memories, as well as non-transitory computer-readable media storing computer-executable instructions that, when executed, by one or more processors perform various acts and/or processes disclosed herein.

Figure 1:
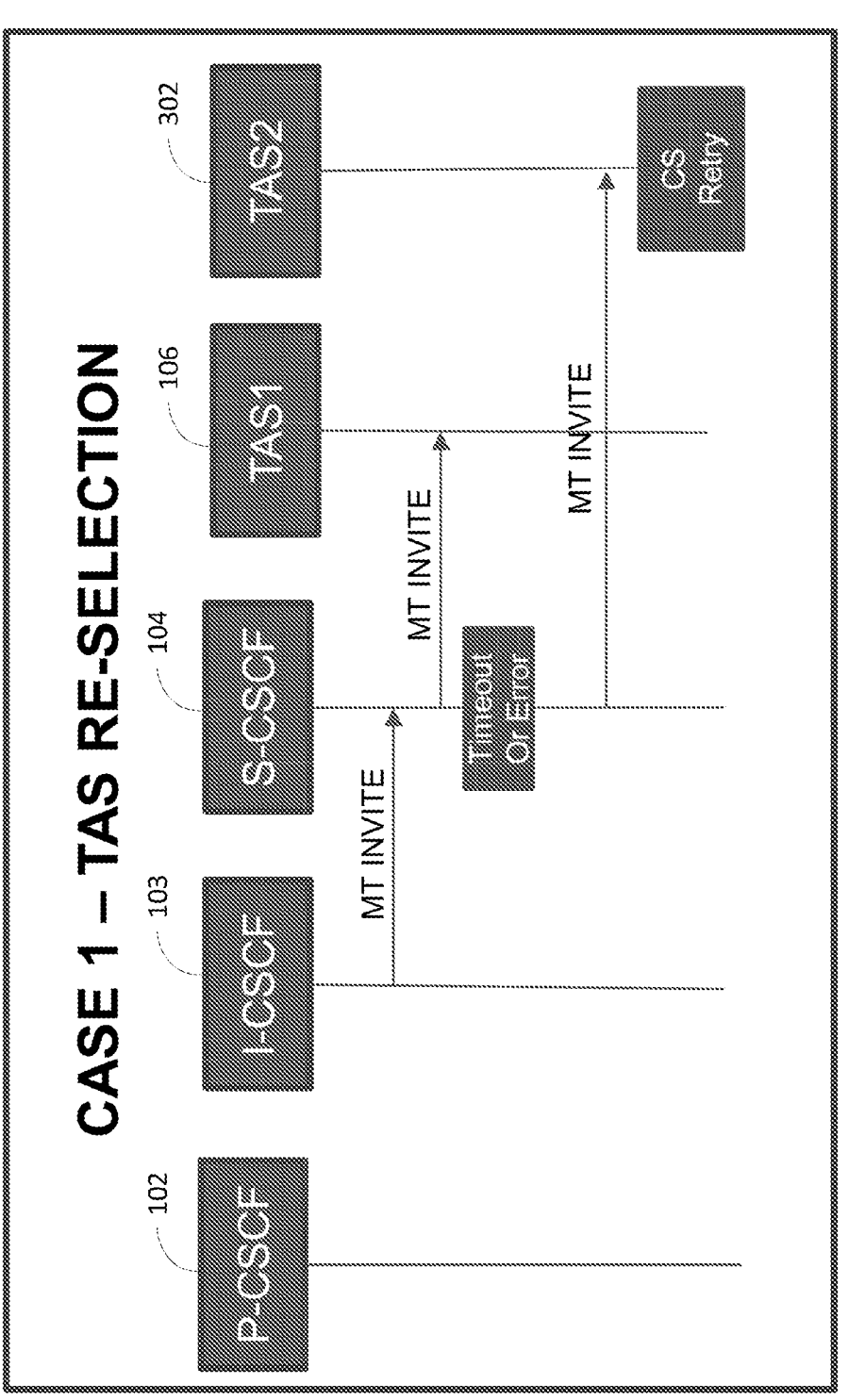
FIG. 1 is a diagram illustrating example signaling between a UE and various nodes within an IMS network during a registration procedure for the UE.

FIG. 1 is a diagram illustrating the technical problem when a TAS 106 stops responding. The S-CSCF 102 may issue an invite to a first TAS1 106. The TAS1 106 may be unresponsive for a variety of reasons as will be explained. The S-CSCF 104 may have to wait on a timer to expire and then it may have to determine an additional TAS2 302 to try to take over for the TAS1.

Figure 2:
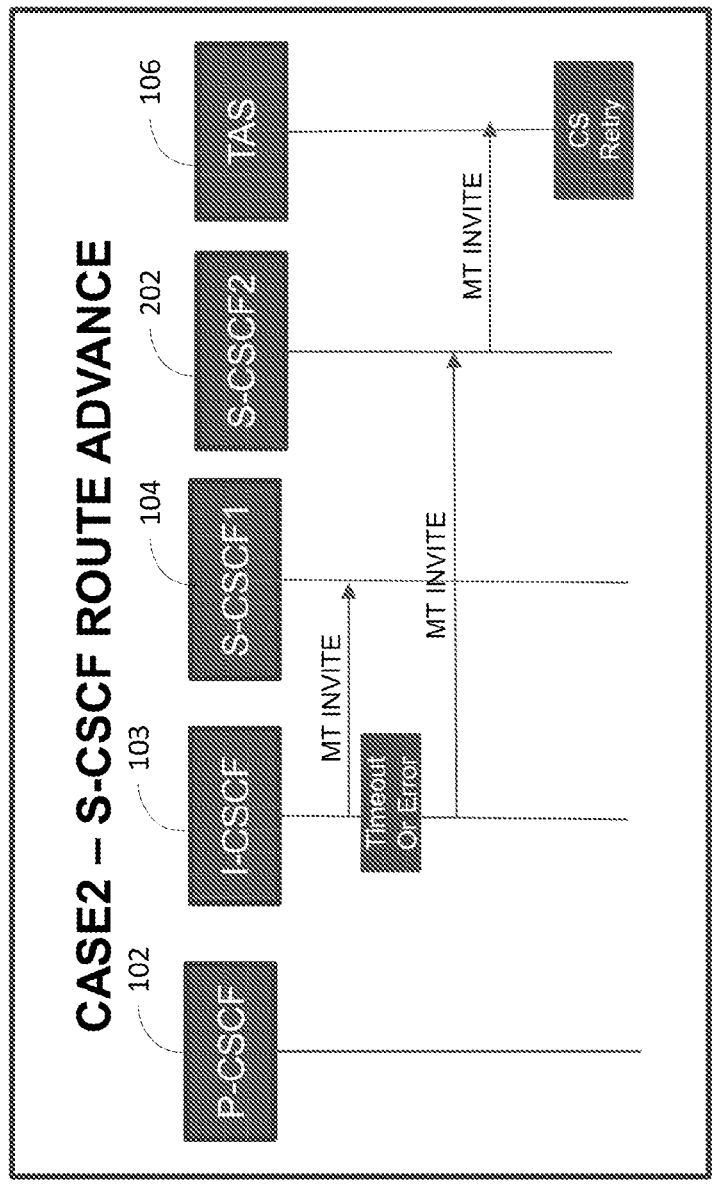
FIG. 2 is a diagram illustrating example signaling between a UE and various nodes within an IMS network to restore a communication session for the UE in the event of S-CSCF node unavailability.

FIG. 2 is a diagram illustrating the technical problem when a S-CSCF1 stops responding. The I-CSCF 102 may issue an INVITE to a first S-CSCF1 104 which may be unresponsive for a variety of reasons as will be explained. The I-CSCF 103 may have to wait on a timer to expire and then it may have to determine an additional S-CSCF2 202 to try to take over for the S-CSCF1.

Figure 3:
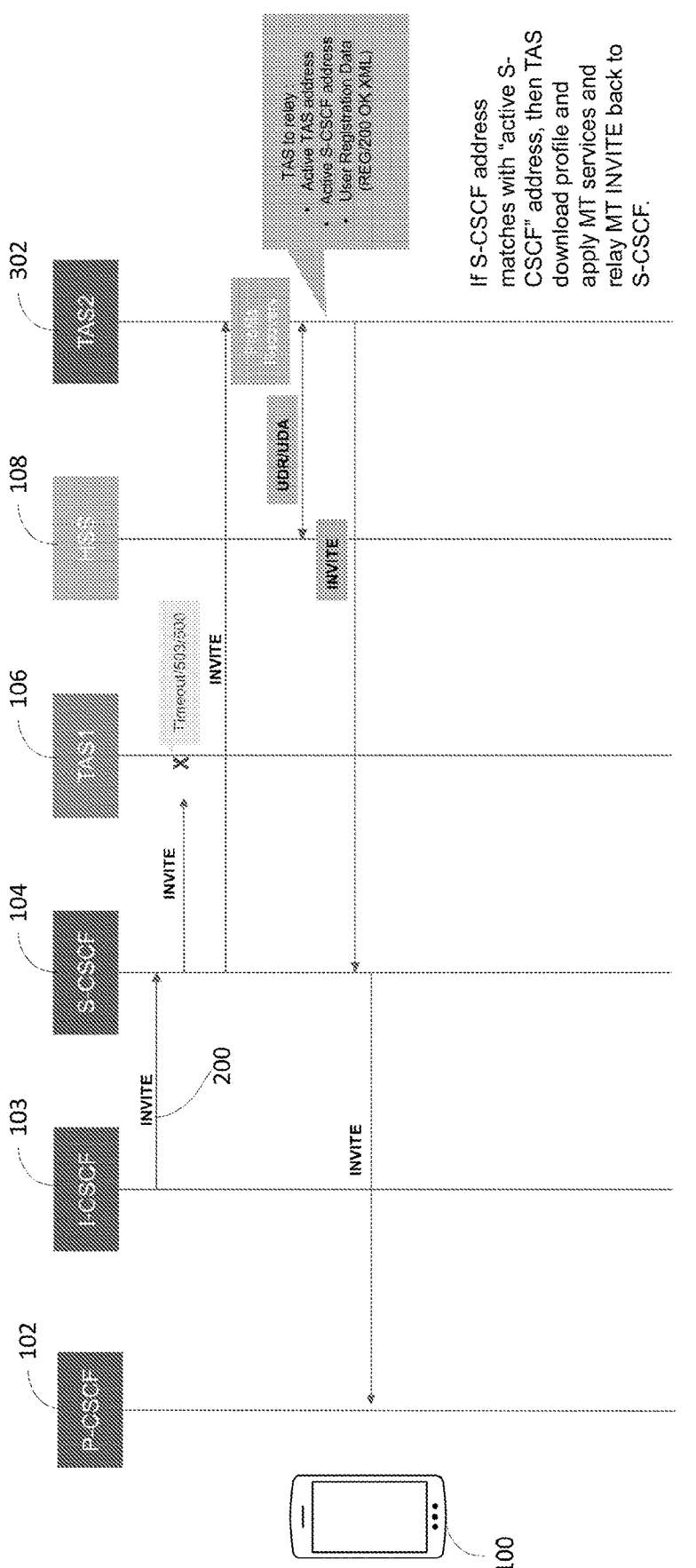
FIG. 3 is a diagram illustrating example signaling between a UE and various nodes within an IMS network to restore a communication session for the UE in the event of AS unavailability.

FIG. 3 is a diagram illustrating example signaling between a UE 100 and various nodes within an IMS network during a registration procedure for the UE 100. The IMS network may include various IMS nodes, including the IMS nodes shown in FIG. 1. FIG. 1 shows a P-CSCF node 102, an I-CSCF node 103, a first S-CSCF node 104 (labeled "S-CSCF-1" 104 in FIG. 1), a first TAS 106, and a HSS 108. It is to be appreciated that the IMS network may include additional nodes that are not shown in FIG. 1, such as nodes including, without limitation, an emergency CSCF (E-CSCF) node, a security gateway (SEG), a session border controller (SBC), and so on.

The IMS network that includes the IMS nodes 102-108 of FIG. 1 may be maintained and/or operated by one or more service providers, such as one or more wireless carriers ("operators"), that provide mobile IMS-based services to users (sometimes called "subscribers") who are associated with UEs, such as the UE 100. The IMS network may represent any type of SIP-based network that is configured to handle/process SIP signaling packets or messages. SIP is a signaling protocol that may be used to establish, modify, and terminate multimedia sessions (e.g., a multimedia telephony call) over packet networks, and to authenticate access to IMS-based services. Individual ones of the IMS nodes 102-108 of FIG. 1 may also be configured to transmit data to/from the HSS 108 using Diameter protocol over a Diameter (Cx) interface. Diameter protocol is defined by the Internet Engineering Task Force (IETF) in RFC 6733.

In accordance with various embodiments described herein, the terms "user equipment (UE)," "wireless communication device," "wireless device," "communication device," "mobile device," and "client device," may be used interchangeably herein to describe any UE (e.g., the UE 100) that is capable of transmitting/receiving data over the IMS network, perhaps in combination with other networks. A user may utilize the UE 100 to communicate with other users and associated UEs via the IMS network. For example, a service provider may offer multimedia telephony services that allow a subscribed user to call or message other users via the IMS network using his/her UE 100. A user may also utilize the UE 100 to receive, provide, or otherwise interact with various different IMS-based services by accessing the IMS network. In this manner, an operator of the IMS network may offer any type of IMS-based service, such as, telephony services, emergency services (e.g., E911), gaming services, instant messaging services, presence services, video conferencing services, social networking and sharing services, location-based services, push-to-talk services, and so on.

Furthermore, the IMS network that includes the IMS nodes 102-108 may enable peer-to-peer, client-to-client, and/or client-to-server, communications over wired and/or wireless networks using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

The UE 100 of FIG. 3 may be configured to register for, and thereafter access and utilize, one or more IMS-based services via the IMS network. To this end, the UE 100 may be configured to transmit, via a radio access network (RAN), messages to the IMS network. For example, the UE 100 may transmit messages to the IMS network as part of an IMS registration procedure where the UE 100 is requesting to register for an IMS-based service. Example signaling that is involved in such a registration procedure is shown in FIG. 3. The information stored at the HSS during this registration procedure allows for restoring a subsequent communication session in the event of S-CSCF unavailability and/or AS unavailability.

Accordingly, a registration procedure for the UE 100 may involve identifying the P-CSCF node 102 and sending a registration request via the RAN to the P-CSCF node 102. SIP may be used for transmitting such a registration message. As used herein, a "SIP request" is a message that is sent from the UE 100 to the IMS network using SIP protocol, and a "SIP response" is a message that is sent from the IMS network to the UE 100 using SIP protocol. Accordingly, a SIP request 110 that uses the SIP "REGISTER" method may be sent to the P-CSCF node 102 during an IMS registration procedure in order to request registration of the UE 100 for an IMS-based service.

The P-CSCF node 102 receives the SIP request 110 (e.g., using the SIP REGISTER method) from the UE 100, and forwards the SIP request 110 to the first S-CSCF node 104. It is to be appreciated that intermediate nodes may exist between any two adjacent IMS nodes shown in FIG. 3. For example, an I-CSCF node may be interposed between the P-CSCF node 102 and the first S-CSCF node 104 to process the SIP request 110 and forward the SIP request 110 to the first S-CSCF node 104. It is also to be appreciated that a user of the UE 100, and/or the UE 100 itself, may be authenticated, such as by using credential validation, signature verification, and the like, as part of the registration procedure.

The first S-CSCF node 104 may represent one of multiple available S-CSCF nodes that is chosen (or otherwise selected) for assignment to the registering UE 100. S-CSCF nodes, such as the first S-CSCF node 104, are sometimes referred to as "Registrars," and the process of allocating Registrars among users who are registering for IMS-based services is sometimes referred to as finding a "home CSCF" for the UE 100.

The first S-CSCF node 104 receives the SIP request 110 from the P-CSCF node 102 (or from an intermediate IMS node), and forwards the SIP request 110 to the first TAS 106. The first TAS 106 may be configured to provide any of the IMS-based services described herein as part of a subsequently established communication session. The first TAS 106 may be selected in any suitable fashion. For example, the S-CSCF node 104 may issue a third party register (TPR) message to discover the first TAS 106 as an available TAS for serving the UE 100. Various additional checks and authentication procedures may be performed during the registration process. If the results of the checks and authentication procedures indicate that the UE 100 may be registered on the IMS network, the first TAS 106 may send a SIP response in the form of a 200 OK message 112 to confirm the successful registration of the UE 100. The 200 OK message 112 may be received by the first S-CSCF node 104, and the first S-CSCF node 104 may forward the 200 OK message 112 to the P-CSCF node 102, which is ultimately received at the UE 100. Before the 200 OK message 112 is forwarded by each IMS node, an individual IMS node (e.g., the first TAS 106, the first S-CSCF node 104, etc.) may insert its identifier within a message header of the 200 OK message 112 to tell another IMS node that the UE 100 is assigned to the IMS nodes identified in the message header. In this manner, future SIP requests originating from the UE 100 and may be forwarded to the appropriate IMS node (e.g., the P-CSCF node 102 knows to forward a SIP request originating from the UE 100 to the first S-CSCF node 104).

Once the UE 100 is successfully registered on the IMS network, the UE 100 may originate a communication session, such a voice communication session (e.g., a phone call). Unless and until the first S-CSCF node 104 and/or the first TAS 106 become unavailable, all SIP signaling that is part of the communication session, and that originates and terminates at the UE 100, is routed through the assigned first S-CSCF node 104 and the first TAS 106. However, either or both of the first S-CSCF node 104 and/or the first TAS 106 may become unavailable (e.g., if these IMS nodes fail due to a malfunction or a crash of hardware or software).

Figure 4:
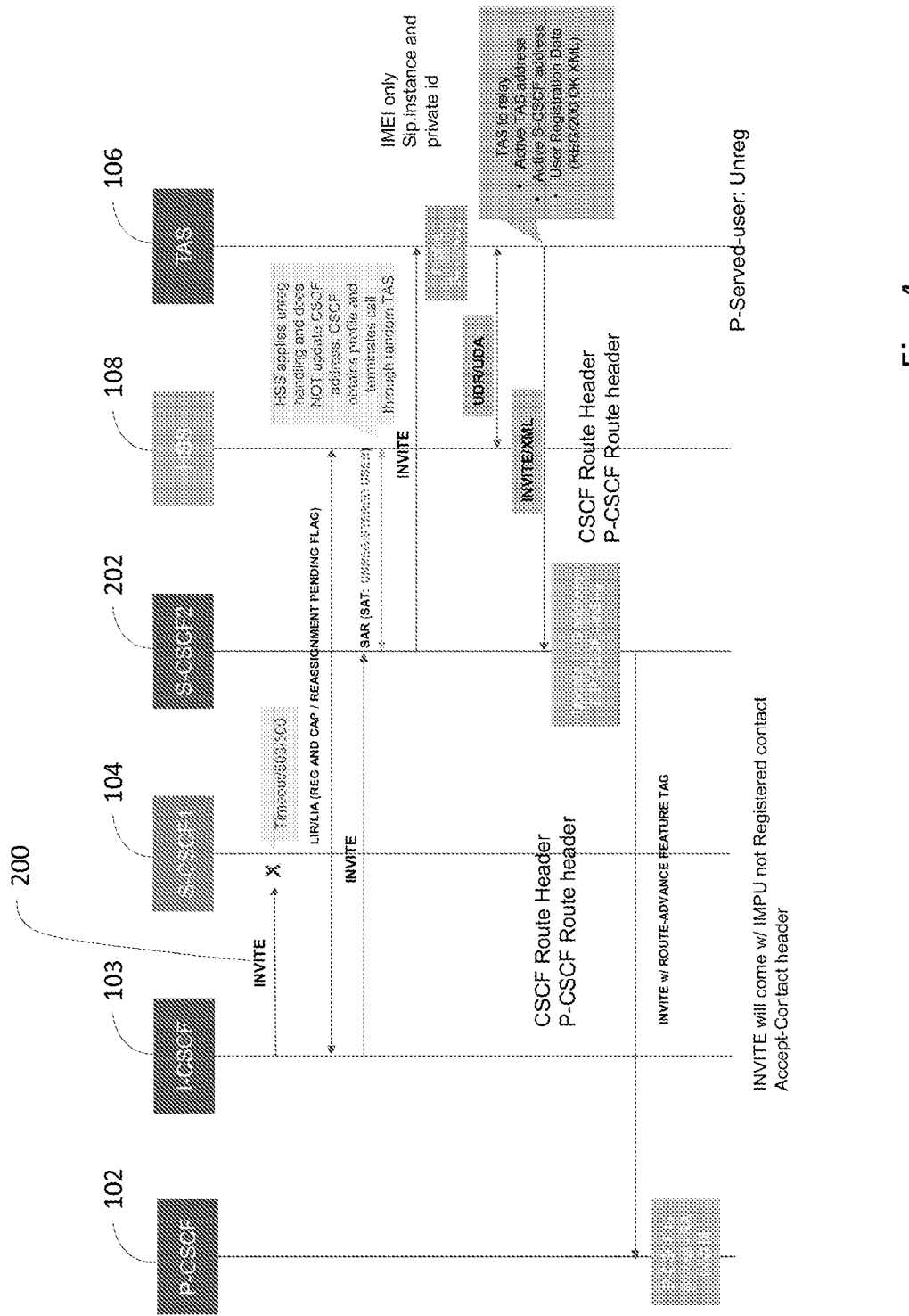
FIG. 4 is a diagram illustrating example signaling for a restoration procedure in the event of S-CSCF node unavailability.

FIG. 3 is a diagram illustrating example signaling between a UE 100 and various IMS nodes within an IMS network to restore a communication session for the UE 100 in the event of the first TAS 106 becoming unavailable. In the example of FIG. 3, the first TAS 106 may have experienced, after the UE's 100 successful registration, a network failure, or some other failure in hardware and/or software of the first TAS 106 that renders the first TAS 106 inoperative, similar to the case in FIG. 4 for the first S-CSCF 104. Alternatively, the first TAS 106 may be operable but is nevertheless unreachable by the currently-assigned S-CSCF node for some reason (e.g., a fiber cut between the assigned S-CSCF node and the first TAS 106). In FIG. 4, the currently assigned S-CSCF node is shown as the first S-CSCF node 104. However, it is to be appreciated that, in the event that the first S-CSCF node 104 also becomes unavailable, the restoration techniques described with reference to FIG. 4 may be carried out to reassign the UE 100 to the second S-CSCF node 202. In this scenario, the currently-assigned S-CSCF node would be the second S-CSCF node 202. Thus, FIG. 3 could be described in the same way using the second S-CSCF node 202 instead of the first S-CSCF node 104.

Before the first S-CSCF node 104 discovers that the first TAS 106 is unavailable, the first S-CSCF node 104 may receive a SIP request 300 that originated from the UE 100 as part of a communication session established for the UE 100. FIG. 3 shows, that the SIP request 300 (such as a SIP INVITE, etc.) may be received by the I-CSCF node 103, and forwarded, by the I-CSCF node 103 to the first S-CSCF node 104. In some embodiments, the SIP request 300 may comprise a SIP message that uses the SIP INVITE method to establish the communication session. As such, the first S-CSCF node 104 may receive a SIP request 300 that uses the SIP INVITE method to originate a communication session (e.g., a voice communication session with another UE).

In response to receiving the SIP request 300 at the first S-CSCF node 104, the first S-CSCF node 104 may attempt to contact the first TAS 106. The first S-CSCF node 104 may know that the first TAS 106 is assigned to the UE 100 from the identifier (e.g., a fully qualified domain name (FQDN), IP address, etc.) of the first TAS 106 that was included in the message header of the 200 OK message 112 received at the first S-CSCF node 104 during the registration procedure.

In response to the first S-CSCF node 104 attempting to contact the first TAS 106, the first S-CSCF node 104 may not receive a response from the first TAS 106. In this "lack of response" scenario, the first S-CSCF node 104 may poll the first TAS 106, and if the first TAS 106 fails to respond to the polling from the first S-CSCF node 104 (e.g., within a predetermined period of time), the first S-CSCF node 104 may determine, based on the lack of response from the first TAS 106 within the predetermined time period, that the first TAS 106 is unavailable. Alternatively, the first S-CSCF node 104 may receive an explicit "negative" response from the first TAS 106, if the first TAS 106 is operational and/or able to communicate with the first S-CSCF node 104. For example, the first TAS 106 may be operational, but overloaded to the point where it cannot handle additional SIP traffic. As another example, the first TAS 106 may experience a corruption in the software that processes SIP traffic, but is otherwise able to communicate with the first S-CSCF node 104 to inform the first S-CSCF node 104 that it is unavailable at the moment due to the corrupt software/code.

In response to determining that the first TAS 106 is unavailable, an IMS restoration technique may be initiated. In one embodiment, the first S-CSCF node 104 may select a second TAS 302 (labeled "TAS2" 302 in FIG. 3), and sends the SIP request 300 to the second TAS 302. The selection of the backup TAS 302 may be implemented in any suitable manner, such as the techniques described in reference to FIG. 4 for selecting a backup S-CSCF node. For example, the second TAS 302 may be a predetermined TAS that is statically mapped as a backup TAS in case of unavailability of the assigned, first TAS 106. In other words, in response to determining that the first TAS 106 is unavailable, the first S-CSCF node 104 may reference a predetermined mapping to select the second TAS 302 by default. Alternatively, the first S-CSCF node 104 may issue a DNS query to a DNS server that returns an IP address (e.g., IPv4, IPv6, etc.) of an available TAS from a pool of available TAS's.

Regardless of how it is selected, the second TAS 302 may receive the SIP request 300 from the first S-CSCF node 104 (or from an intermediate IMS node). At this point in time, the second TAS 302 has no information regarding the UE's 100 registration status. Accordingly, the second TAS 302 is configured to send a UDR message 304 to the HSS 108 in order to obtain, from the HSS repository 118 the active S-CSCF address and user registration data such as (REG/ 200 OK XML). If the S-CSCF address matches with an active address, then the TAS may download profile and apply MT services and relay MT INVITE back to the S-CSCF then to the P-CSCF.

In another embodiment, a header may be used to communicate from the S-CSCF to the TAS2 that the S-CSCF is the serving CSCF for the node. The header may allow the TAS to communicate with the S-CSCF in regard to the node or may be used as verification that the matched S-CSCF is the correct S-CSCF for the node.

With the contact binding 308 created at the second TAS 302, and the HSS repository 118 updated to reflect the UE's 100 association with the second TAS 302, the second TAS 302 may forward the SIP request 300 to a next hop 314 (i.e., a next IMS node). In the case of a communication session with another UE, the SIP request 300 may ultimately be forwarded as a SIP response to the other UE to allow the multiple UEs to communicate over the IMS core.

FIG. 4 is a diagram illustrating example signaling between the UE 100 and various IMS nodes within the IMS network to restore a communication session for the UE 100 in the event of the first S-CSCF1 node 104 becoming unavailable. In the example of FIG. 2, the first S-CSCF1 node 104 may have experienced, after the UE's 100 successful registration, a network failure, or some other failure in hardware and/or software of the first S-CSCF1 node 104 that renders the first S-CSCF1 node 104 inoperative. Alternatively, the first S-CSCF1 node 104 may be operable but is nevertheless unreachable by the I-CSCF node 103 for some reason (e.g., a fiber cut between the P-CSCF node 102 and the first S-CSCF1 node 104).

Before the I-CSCF 103 discovers that the first S-CSCF1 node 104 is unavailable, the I-CSCF 103 may receive a SIP request 200 from the UE 100 as part of a communication session established for the UE 100. For example, the SIP request 200 may comprise a SIP message that uses the SIP INVITE method to establish the communication session. As such, the I-CSCF node 103 may receive a SIP request 200 that uses the SIP INVITE method to originate a communication session (e.g., a voice communication session with another UE).

In response to receiving the SIP request 200 at the I-CSCF node 103, the I-CSCF node 103 may attempt to contact the first S-CSCF1 node 104. The I-CSCF node 103 may know that the first S-CSCF1 node 104 is assigned to the UE 100 from the identifier (e.g., a fully qualified domain name (FQDN), IP address, etc.) of the first S-CSCF1 node 104 that was included in the message header 200 of an OK message received at the I-CSCF node 103 during the registration procedure. The HSS repository 108 may also maintain the binding between the UE 100 and the first S-CSCF1 node 104.

In response to the I-CSCF node 103 attempting to contact the first S-CSCF1 node 104, the I-CSCF node 103 may not receive a response from the first S-CSCF1 node 104. In this "lack of response" scenario, the I-CSCF node 103 may poll the first S-CSCF1 node 104, and if the first S-CSCF1 node 104 fails to respond to the polling from the I-CSCF node 103 (e.g., within a predetermined period of time), the I-CSCF node 103 may determine, based on the lack of response from the first S-CSCF1 node 104 within the predetermined time period, that the first S-CSCF1 node 104 is unavailable. Alternatively, the I-CSCF node 103 may receive an explicit "negative" response from the first S-CSCF1 node 104, if the first S-CSCF1 node 104 is operational and/or able to communicate with the I-CSCF node 103. For example, the first S-CSCF1 node 104 may be operational, but overloaded to the point where it cannot handle additional SIP traffic. As another example, the first S-CSCF1 node 104 may experience a corruption in the software that processes SIP traffic, but is otherwise able to communicate with the I-CSCF node 103 to inform the I-CSCF node 103 that it is unavailable at the moment due to the corrupt software/code.

In response to determining that the first S-CSCF1 node 104 is unavailable, an IMS restoration technique is initiated where the I-CSCF node 103 communicates a message to the HSS for assistance. The message may be a LIR (location information request) message which may respond with a LIA (location information acknowledgment) message which may include the REG (registration) and CAP (capabilities) of S-CSCF1. It also may set a reassignment pending flag in the HSS.

The I-CSCF may then communicate an INVITE request the newly selected S-CSCF2 202. The route advance logic may be implemented to discover the second, available S-CSCF node 202 in various ways. For example, the second S-CSCF2 node 202 may be a predetermined S-CSCF node that is statically mapped as a backup S-CSCF node in case of unavailability of the assigned, first S-CSCF1 node 104. In other words, in response to determining that the first S-CSCF1 node 104 is unavailable, the I-CSCF node 103 may reference a predetermined mapping to select the second S-CSCF2 node 202 by default. Alternatively, the I-CSCF node 103 may issue a domain name system (DNS) query to a DNS server that returns an IP address (e.g., IPv4, IPv6, etc.) of an available S-CSCF node from a pool of available S-CSCF nodes. In some embodiments, the pool of available S-CSCF nodes may be returned in response to the DNS query, and the I-CSCF node 103 may select one of the S-CSCF nodes in the pool of available S-CSCF nodes. In any case, the DNS server that receives such a DNS query may have access to a traffic distribution server to determine one or more appropriate S-CSCF nodes from a pool of available S-CSCF nodes. The traffic distribution server may use criteria for allocating the second S-CSCF node 202, and the criteria may include any suitable criteria, such as load balancing criteria and other service criteria. For example, the traffic distribution server may have a preference for choosing the second S-CSCF node 202 because it is experiencing less traffic than other S-CSCF nodes, or because it has a lower processing load as compared to other S-CSCF nodes that are overloaded or handling a high volume of network traffic.

The S-CSCF2 202 may communicate a SAR (service assignment request) which may include a SAT=UNREGISTERED_USER message to delete any restoration information in the HSS 108. The SAR message 204 may include a server assignment type (SAT) value set to "NO_Assignment" in order to receive the registration data for the UE 100. An example of a SAR message 204 is as follows: SAR (IMPU, S-CSCF Name, SAT=NO_ASSIGNMENT), where IMPU is the IP multimedia public identity of the UE 100. The HSS 108 may apply unregistered handling and may not update the S-CSCF address. The S-CSCF2 may obtain profile data (REG/CAP) and terminate the call or IMS service through a random TAS.

The S-CSCF2 202 may communicate an unregistered INVITE to the TAS 106. The TAS may access profile recovery data. The TAS 106 may communicate a UDR (user discovery request) to the HSS 108 and the HSS 108 may respond with a UDA (user discovery acknowledgment) response to get service data. The TAS 106 may then communicate an INVITE response to the S-CSCF2 202 which may be an XML file. The XML file may contain data such as the active TAS address, the active S-CSCF address and user registration data such as (REG/200 OK XML). The data may also include S-CSCF route header and the P-CSCF route header. In the case where the TAS only has an IMEI (international mobile equipment identity) the SIP.instance and private id may be communicated.

The S-CSCF2 may update the TAS address and P-CSCF bindings based on the received data from the TAS. The S-CSCF2 may then communicate the P-CSCF an INVITE message with route advanced feature tag such as a S-CSCF route header and the P-CSCF route header.

The P-CSCF may the process the RA INVITE message. The P-CSCF may be enabled to receive the INVITE from an unregistered S-CSCF2 202 or a S-CSCF2 that is not in its profile. The INVITE may come with IMPU (IMS public identity) not Registered contact message and an ACCEPT-Contact header.

In short, the TAS stores the repository data needed to restore a IMS service if the S-CSCF fails or the TAS fails. In another embodiment, there may be a single TAS that stores the repository data and other TASs know to contact the single TAS to obtain the repository data to restore services. The profile S-CSCF address and P-CSCF name and binding may be stored by the single TAS in a known format and may be accessed using known APIs.

Figure 5:
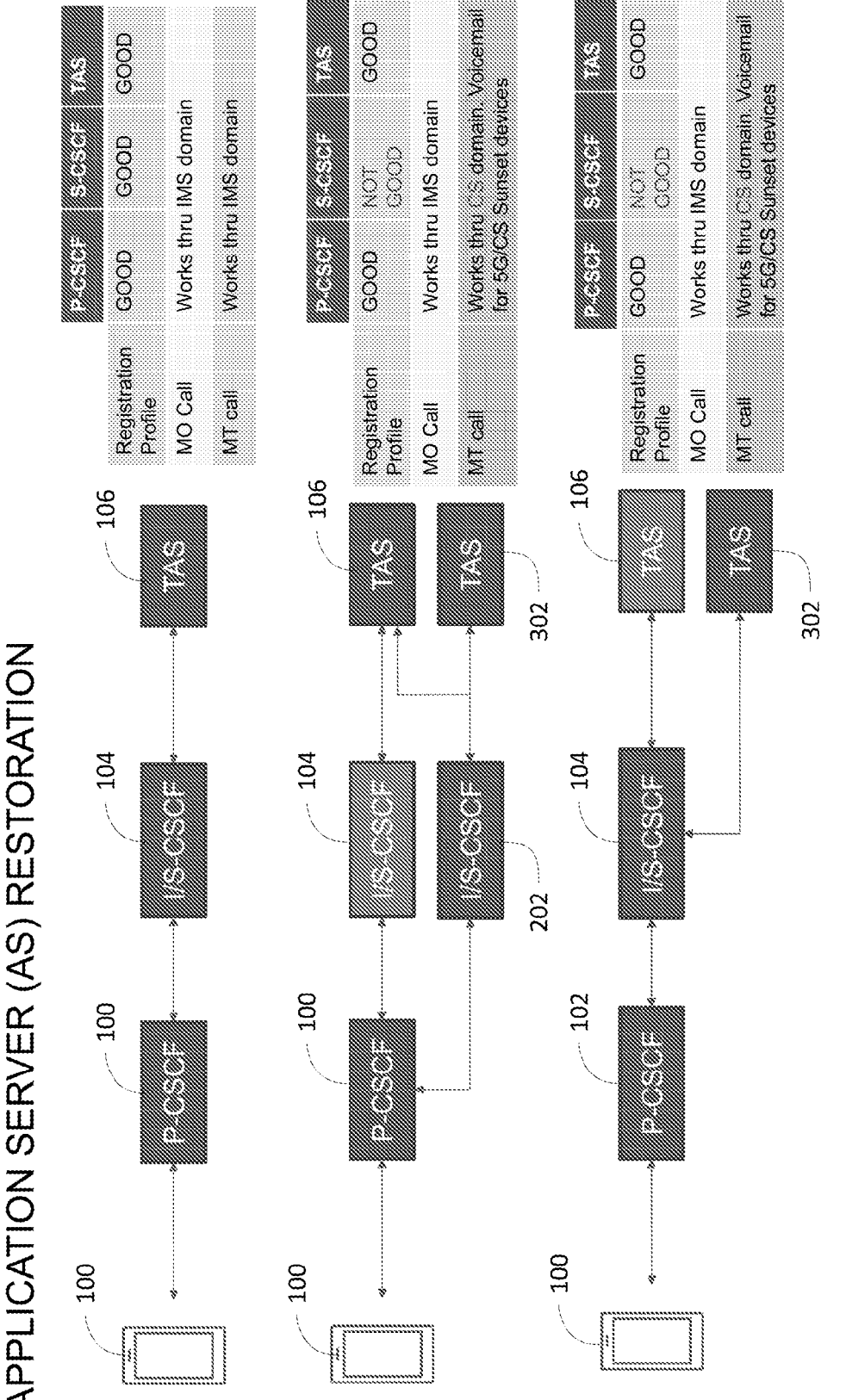
FIG. 5 illustrates a summary if issues address during profile recovery.

FIG. 5 may be a summary of the flow of the system and method. If both the S-CSCF 104 and TAS 106 are operating properly, registration profiles may be good, MO (mobile originated) calls may work through the IMS domain and MT (mobile terminated) calls may work through the IMS domain, If the S-CSCF 104 is down, the registration profile for the S-CSCF 104 may not be good, MO calls may work through the IMS domain and MT calls may work through the CS domain while voicemail may be used for 5G/CS sunset devices. If the TAS 106 is down, the registration profile for the S-CSCF 104 may not be good, MO calls may work through the IMS domain and MT calls may work through the CS domain while voicemail may be used for 5G/CS sunset devices.

The processes described in this disclosure may be implemented by the architectures described herein, or by other architectures. These processes are illustrated as a collection of blocks in a logical flow graph. Some of the blocks represent operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order or in parallel to implement the processes. It is understood that the following processes may be implemented on other architectures as well.

Figure 6:
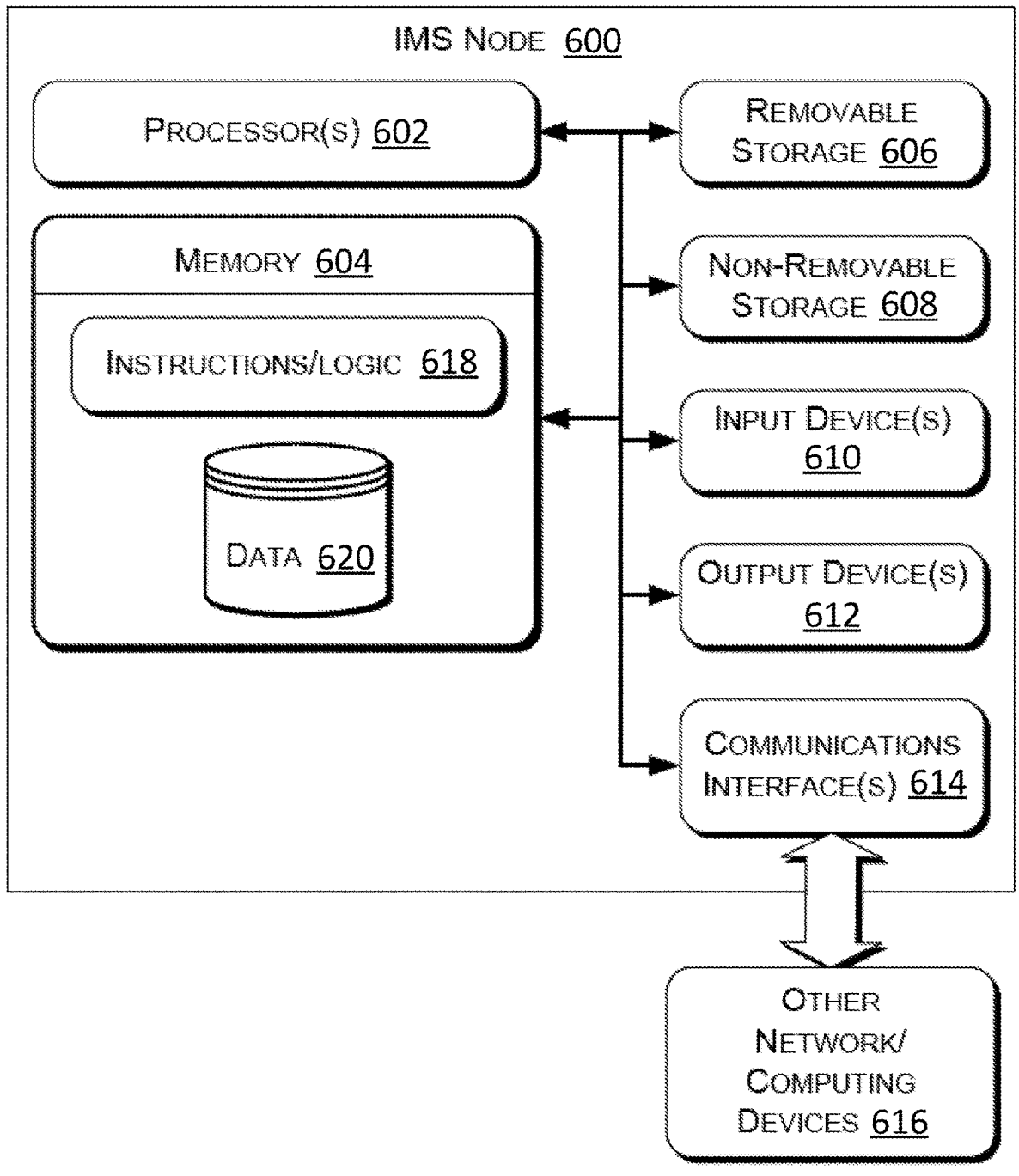
FIG. 6 is a block diagram of an example IMS node architecture in accordance with various embodiments.

FIG. 6 is a block diagram of an example IMS node 500 architecture in accordance with various embodiments. The IMS node(s) 500 may be representative of an individual P-CSCF node 102, an individual S-CSCF node (e.g., the first S-CSCF node 104 or the second S-CSCF node 202), an individual AS (e.g., the first TAS 106 or the second AS 302), or the HSS 108.

As shown, the IMS node(s) 500 may include one or more processors 502 and one or more forms of computer-readable memory 504. The IMS node(s) 700 may also include additional storage devices. Such additional storage may include removable storage 506 and/or non-removable storage 508.

The IMS node(s) 600 may further include input devices 610 and output devices 612 communicatively to the processor(s) 602 and the computer-readable memory 604. The IMS node(s) 600 may further include communications interface (s) 614 that allow the IMS node(s) 600 to communicate with other network/computing devices 616 such as via a network. The communications interface(s) 614 may facilitate transmitting and receiving wired and/or wireless signals over any suitable communications/data technology, standard, or protocol, as described herein. For example, the communications interface(s) 614 may comprise a SIP (ISC) interface configured to transmit SIP traffic/signaling to the other network/computing devices 616. As another example, the communications interface(s) 614 may comprise a Diameter (Cx) interface configured to transmit messages and data to/from the other network/computing devices 616 using Diameter protocol. In this scenario, the HSS 108 is typically involved in such communication, whether the HSS 108 is the IMS node 600, or the other network/computing device 616.

In various embodiments, the computer-readable memory 604 comprises non-transitory computer-readable memory 604 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 604 may also be described as computer storage media and may include volatile and nonvolatile, removable and non-removable media implemented in any method or technology for storage of information, such as computer readable instructions, data structures, program modules, or other data. Computer-readable memory 604, removable storage 606 and non-removable storage 608 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which may be used to store the desired information and which may be accessed by the IMS node(s) 600. Any such computer-readable storage media may be part of the IMS node(s) 600.

The memory 604 may include computer-executable instructions 618 (or logic 618) that, when executed, by the processor(s) 602 perform the various acts and/or processes disclosed herein. For example, when the IMS node 600 represents the P-CSCF node 102, the instructions/logic 618 may comprise route advance logic to select a second S-CSCF node 202 in the event that a first S-CSCF node 104 becomes unavailable. As another example, when the IMS node 600 represents an S-CSCF node (e.g., the first S-CSCF node 104 or the second S-CSCF node 202), the instructions/logic 618 may comprise route advance logic to select a second TAS 302 in the event that a first TAS 106 becomes unavailable, as well as logic to send SAR messages and UDR messages to the HSS 108 using Diameter protocol, and logic to receive SAA messages and UDA messages from the HSS 108 over a Diameter interface. When the IMS node 600 represents an AS (e.g., the first TAS 106 or the second AS 302), the instructions/logic 618 may comprise logic to send UDR messages and SNR messages to the HSS 108 using Diameter protocol, and logic to receive UDA messages and SAA messages from the HSS 108 over a Diameter interface. The instructions/logic 618 of the IMS node 500 may further comprise logic for transmitting messages and data over the communications interface(s) 614, using any suitable protocol (e.g., SIP, Diameter, etc.). The memory 604 may also maintain or persist data 620 in any suitable type of data repository, such as a database. For example, the data 620 may represent user profiles including contact bindings in local storage of the IMS node 600. The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

The invention claimed is:

1. A method comprising:
communicating an INVITE to a first telephony application server (TAS);
determining that the first TAS is non-responsive;
communicating the INVITE to a second TAS;
beginning a profile recovery by the second TAS, the profile recovery comprising:
communicating a user discover request (UDR) message to a home subscriber server (HSS), and
receiving profile data from the HSS, wherein the profile data comprises an active TAS address, an active S-CSCF address, and user registration data;
if the active S-CSCF address matches with an active address, then the second TAS:
downloads the profile data;
applies mobile terminating (MT) services; and
communicating profile data to a serving call session control function (S-CSCF) in an MT INVITE message.
2. The method of claim 1, wherein a header is used to communicate from the S-CSCF to the second TAS that the S-CSCF is a designated S-CSCF.
3. A method comprising:
communicating a first INVITE to a first serving call session control function (S-CSCF);
determining that the first S-CSCF is non-responsive;

communicating from an interrogating call session control function (I-CSCF) a second INVITE request to a second S-CSCF;
communicating an unregistered third INVITE to a telephony application server (TAS) from the second S-CSCF;
communicating a user discovery request (UDR) from TAS to a home subscriber server (HSS);
receiving a user discovery acknowledgment (UDA) from the HSS at the TAS;
communicating an INVITE response from the TAS to the second S-CSCF, the INVITE response comprising profile data from the HSS;
communicating from the second S-CSCF to a proxy call session control function (P-CSCF) a fourth INVITE message with a route advanced feature tag; and
processing the fourth INVITE message.
4. The method of claim 3, wherein if the TAS only has an international mobile equipment identity (IMEI), a SIP.instance and a private identifier are communicated.
5. The method of claim 3, wherein the P-CSCF is be enabled to receive the fourth INVITE from the second S-CSCF when the S-CSCF is an unregistered S-CSCF.
6. The method of claim 3, wherein there is a single TAS that stores repository data and other TASs are configured to contact the single TAS to obtain the repository data to restore services.
7. The method of claim 3, further comprising, after determining that the first S-CSCF is non-responsive:
communicating a location information request (LIR) message to the HSS; and
receiving a location information answer (LIA) message from the HSS, the LIA message including registration data and capabilities of the first S-CSCF.
8. The method of claim 3, further comprising, after receiving the second invite request:
communicating from the second S-CSCF to the HSS a service assignment request (SAR); and
applying unregistered handling at the HSS.
9. The method of claim 8, wherein the SAR includes:
a SAT=UNREGISTERED_USER message, and
a server assignment type (SAT) value set to "NO_Assignment".
10. The method of claim 3, wherein the profile data comprises an active TAS address, an active S-CSCF address, and user registration data.
11. The method of claim 10, further comprising updating, at the second S-CSCF, the active TAS address and P-CSCF bindings based on the profile data.
12. The method of claim 3, wherein the route advanced feature tag includes:
a S-CSCF route header, and
a P-CSCF route header.
13. The method of claim 12, wherein the S-CSCF route header and the P-CSCF route header are communicated in a header field.
14. A system comprising:
one or more processors; and
a plurality of programming instructions that, when executed by the one or more processors, cause the system to perform operations including:
communicating an INVITE to a first telephony application server (TAS);
determining that the first TAS is non-responsive;
communicating the INVITE to a second TAS;
beginning a profile recovery by the second TAS, the profile recovery comprising:

communicating a user discover request (UDR) message to a home subscriber server (HSS), and
receiving profile data from the HSS, wherein the profile data comprises an active TAS address, an active S-CSCF address, and user registration data; 5
if the active S-CSCF address matches with an active address, then the second TAS:
downloads the profile data;
applies mobile terminating (MT) services; and
communicating profile data to a serving call session 10 control function (S-CSCF) in an MT INVITE message.

15. The system of claim 14, wherein a header is used to communicate from the S-CSCF to the second TAS that the S-CSCF is a designated S-CSCF. 15

16. The system of claim 14, wherein the communicating the INVITE to the first TAS and to the second TAS and the determining that the first TAS is non-responsive are performed by the S-CSCF.

\* \* \* \* \* 20